United States Patent [19]
Golze

[11] 3,791,700
[45] Feb. 12, 1974

[54] VEHICLE WHEEL TRIM
[75] Inventor: Richard R. Golze, Bloomfield Hills, Mich.
[73] Assignee: Rockwell International Corporation, Pittsburgh, Pa.
[22] Filed: Oct. 28, 1971
[21] Appl. No.: 193,386

[52] U.S. Cl. .......................................... 301/37 CM
[51] Int. Cl. ............................................. B60b 7/04
[58] Field of Search ............ 301/37 R, 37 P, 37 CM

[56] References Cited
UNITED STATES PATENTS
3,436,123 4/1969 Aske ............................. 301/37 CM
3,480,329 11/1969 Foster ............................. 301/37 R FOREIGN PATENTS OR APPLICATIONS
550,186 12/1957 Canada .......................... 301/37 CM Primary Examiner—Richard J. Johnson

[57] ABSTRACT

A wheel trim for a motor vehicle including a wheel cover formed from a first material and attachment means for securing the wheel cover to a vehicle wheel. A wheel trim ornament is formed from a second material, disposed over at least a portion of the wheel cover and has extending therefrom in the direction of the wheel cover at least one flexible projection. Fastener means interconnect the wheel cover and the flexible projection.

2 Claims, 3 Drawing Figures

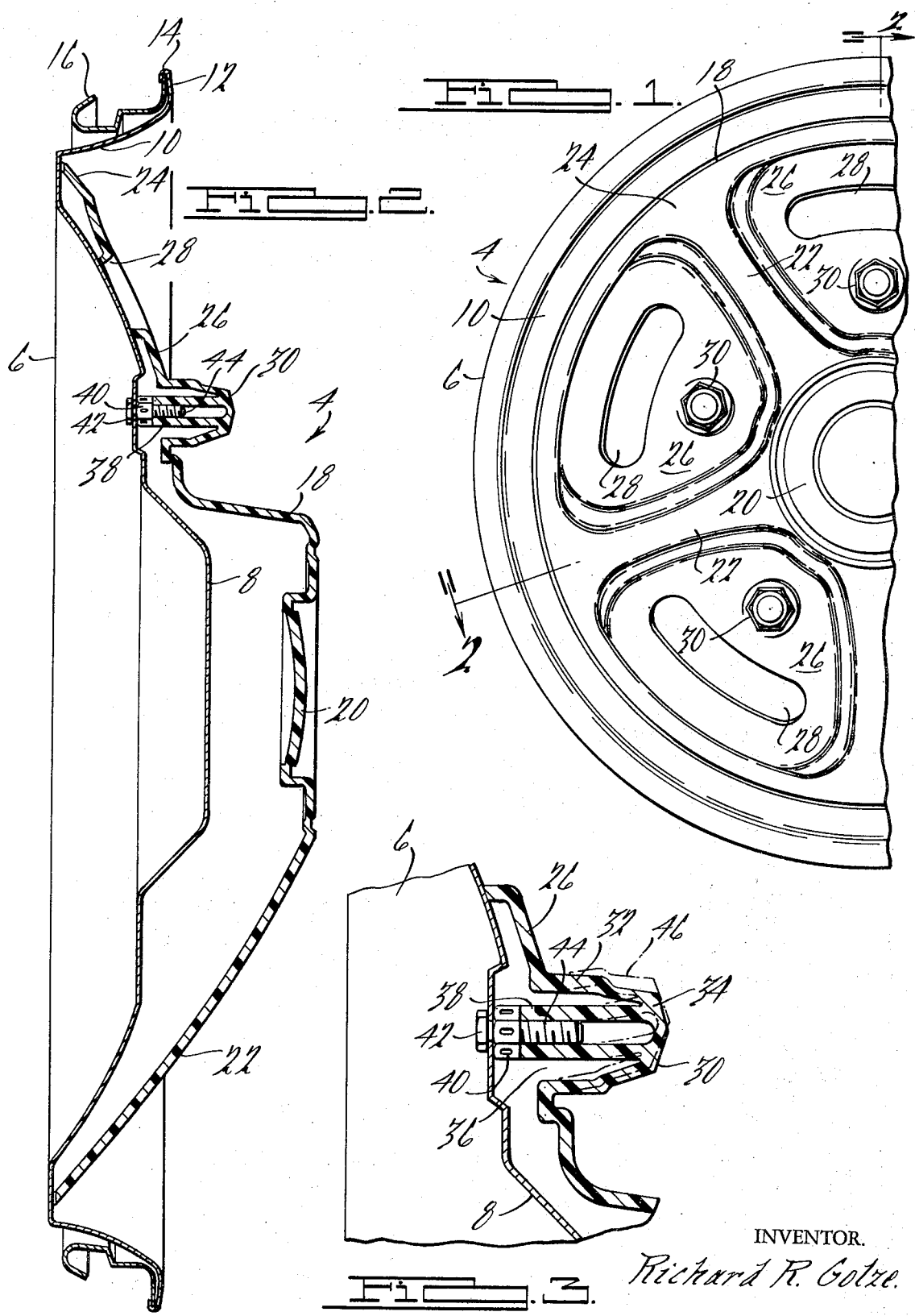

VEHICLE WHEEL TRIM

BACKGROUND OF THE INVENTION

The advantages of providing vehicle wheel trim including a wheel cover formed from steel sheet are well known. Steel sheet, besides being economical in cost, easily may be formed by relatively simple stamping operations into many desired configurations. This allows attachment means for securing the wheel cover to a vehicle wheel to be mounted on the wheel cover during the stamping operation or integrally formed as part of the wheel cover. Additionally, the steel sheet may be provided with a bright or other decorative finish by techniques well developed in the art.

A limitation on such a use of steel sheet, however, is where a decorative wheel trim having a relatively complex configuration is desired. Many such configurations are impossible to achieve from steel sheet because of limitations on the magnitude of draw that can be applied to this material during stamping without fracture. A conventional expedient to avoid this limitation of steel sheet and still gain many of the advantages attendant its use in a vehicle wheel trim is to combine a steel sheet wheel cover with an ornamental element formed of a dissimilar material disposed over at least a part of the wheel cover. It is known to provide such ornamental elements that are zinc die castings as such castings can be formed to almost any desired shape and easily bolted or riveted to the wheel cover since the coefficients of linear expansion of steel and zinc do not vary to a great degree. The major disadvantage to such a use of zinc die castings, however, are the relatively high cost of such members and the weight which contribute to a major balance problem.

It is an object of this invention to provide a vehicle wheel trim having the advantages listed above for wheel trims including zinc die cast ornaments but without the cost penalty associated with such ornaments and light weight which reduces the balance problem. The wheel trim of this invention includes an ornamental element of plastic material that may be injection molded or otherwise formed to desired complex configurations at a low cost. A further object of the invention is to provide a novel scheme for securing the ornamental plastic element to a sheet metal wheel cover in a novel manner that will accommodate the differential thermal expansion and contraction of plastic and steel due to the differing coefficients of linear expansion without damage to the plastic element or to the connection between the wheel cover and the plastic element. Furthermore, the interconnection between these members is such that the wheel trim should not be affected by the usual vehicle wheel deflection and distortion occurring particularly when a motor vehicle is driven over rough roads and on sharp turns.

SUMMARY OF THE INVENTION

A vehicle wheel trim constructed in accordance with this invention includes a wheel cover formed from a metallic first material. Attachment means are provided for securing the wheel cover to a vehicle wheel. A wheel trim ornament is formed from a second material, disposed over at least a portion of the wheel cover and has extending therefrom toward the wheel cover at least one flexible projection. Fastener means interconnect the wheel cover and the flexible projection that will flex to accommodate relative movement due to thermal expansion and contraction between the wheel cover and the ornament as well as the vehicle wheel deflection and distortion occurring when the vehicle is driven over rough roads and on sharp turns.

DESCRIPTION OF THE DRAWING

FIG. 1 is a partial front elevation view of a vehicle wheel trim constructed in accordance with this invention;

FIG. 2 is a sectional elevation view taken along the line 2—2 of FIG. 1; and

FIG. 3 is an enlarged view of the portion of the structure of FIG. 2 illustrating the details of the interconnection between the elements of the wheel trim of FIGS. 1 and 2.

DETAILED DESCRIPTION OF THE INVENTION

Referring now in detail to the drawing, the numeral 4 denotes generally a wheel trim constructed in accordance with this invention. This wheel trim includes a steel sheet wheel cover 6 adapted to be positioned against a vehicle wheel. The wheel cover 6 has a dish shaped central portion 8 surrounded by an angularly inclined outer flange 10 having a radially extending outer margin 12. The outermost portion of the margin 12 is rolled over as at 14 to secure a plurality of gripping spring fingers 16 are adapted to deformably engage and grip a vehicle wheel to secure the wheel trim 4 to the wheel. Although the gripping fingers 16 are shown as discrete elements from the wheel cover 6, it is well known in the art to form the gripping fingers 16 as integral portions of the wheel cover.

A generally dish shaped decorative ornament 18 formed from plastic material is disposed over a portion of the wheel cover 6. Ornament 18 easily may be formed by injection molding or other suitable plastic formation techniques. The configuration of ornament 18 illustrated simulates the appearance of a decorative steel wheel although the ornament 18 may have any number of configurations within the scope of this invention. The ornament 18 includes a central medallion 20 and a plurality of radially extending raised ribs 22 interconnecting the central medallion with an outer rim 24. A plurality of depressed portions 26 are located between the raised ribs 22. Apertures 28 are formed in these depressed portions to allow the surface of the wheel cover 6 to be seen to further enhance the decorative appearance of the wheel trim. This aperture 28 also permits air circulation to cool the wheel brake drum. Also located within each of the depressed portions 26 are simulated wheel nuts 30 that may be seen in detail by reference to FIG. 3 of the drawing.

The raised configuration of the simulated wheel nuts 30 allows attachment of the plastic ornament 8 to the steel wheel cover 6 by the novel scheme of this invention. Each of the simulated wheel nuts 30 comprises an elongated projection 32 extending in a direction away from the wheel cover 6. The extremity of the projection 32 remote from the wheel cover 6 is closed by an end wall 34 and the projection is hollow and has an open end 36 proximate the wheel cover 6.

Extending from the inner surface of the end wall 34 in an elongated, hollow column 38 integrally molded with the plastic ornament 18. The end of column 38 most remote from end wall 34 has secured thereto a palnut 40. The palnut 40 may be joined to the end of the column 38 by molding during the formation of the ornament 18 or may be secured to the end of the column 38 by any suitable adhesive or simply pressed on by the application of a suitable force. The longitudinal dimension of the column 38 is such that when the ornament 18 is positioned against the wheel cover 6 the palnut 40 is contiguous to the surface of the wheel cover as illustrated in FIGS. 2 and 3. A bolt having a head 42 extends from within the wheel cover 6, through an aperture in the wheel cover and is engaged by the palnut 40. The shank 44 of bolt 42 is accommodated within the hollow interior of column 38.

Because of its elongated shape, plastic column 38 is flexible and comprises a movable connection between the plastic ornament 18 and steel wheel cover 6 that accommodates relative movement of these parts due to differential thermal expansion and contraction as well as deflection and distortion of the wheel trim during rugged operating conditions.

As is well known the coefficient of linear expansion of plastic is much greater than that of steel. This has prevented the use of plastic on decorative wheel trim ornaments as described above because the greated expansion and contraction of plastic relative to a metal wheel cover has caused damage to the integrity of the plastic ornament as well as a destruction of the interconnections between the ornament and the wheel cover.

As may be appreciated from reference to FIG. 3 of the drawings, differential expansion and contraction of plastic element 30 in no way deleteriously effects the wheel trim 4. Represented in phantom at 46 in FIG. 3 is a position the plastic ornament 18 can assume due to the greater thermal expansion of the plastic material as would occur during elevated ambient temperatures. This expansion causes a relative movement of the plastic of ornament 18 compared to the steel material of the wheel cover 6 that is accommodated by a outwardly directed flexing of the elongated column 38. Since the plastic material of column 38 can flex within its elastic limits, the relative movement of the ornament 18 does not result in breakage of the ornament or the destruction of the interconnection between the ornament and the wheel cover. Such flexing of the column 38 also might occur during vehicle wheel deflections and distortions that occur particularly when a vehicle is driven over rough roads or around sharp road curves.

It thus may be seen that this invention provides a vehicle wheel trim including an ornamental element of plastic material that may be injection molded or otherwise formed by relatively inexpensive techniques to desired complex configurations. This invention also provides a novel scheme for securing the ornamental plastic element to a sheet metal wheel cover so that differential thermal expansion and contraction of the plastic and steel due to differing coefficients of linear expansion is accommodated without damage to the plastic element or the connection between the plastic element the wheel cover. Furthermore, this novel interconnection between the members allows the wheel trim to accommodate distortion of the wheel shape due to vehicle operation over rough roads or around sharp turns.

What is claimed is:

1. A wheel trim for a motor vehicle wheel, said wheel trim comprising a wheel cover formed from metallic material, means carried by said wheel cover for securing said wheel cover to a vehicle wheel, a decorative ornament disposed over at least a portion of said wheel cover and being formed from a second material having a coefficient of linear expansion different from said first material, a flexible elongate hollow column integrally formed with said ornament and extending from said ornament toward said wheel cover, and fastener means interconnecting the extremity of said flexible column remote from said ornament to said wheel cover, said ornament being formed with a projection extending therefrom in a direction away from said wheel cover, said projection being hollow, closed by an end wall at its extremity remote from said wheel cover and open ended proximate said wheel cover, said column extending from said end wall through said projection and open end of said projection toward said wheel cover.

2. A wheel trim for a motor vehicle wheel comprising a wheel cover first element formed from a first material attachment means for securing said first element to a vehicle wheel, a second element formed from a second material disposed over at least a portion of said first element and having at least one flexible elongate projection integrally formed with said second element and extending therefrom towards said first element, and means interconnecting said first element with said flexible projection, said interconnection means including a first fastener member carried by the extremity of said columns remote from said second element and a second fastener member cooperating with said first fastener element and securing the latter to said first element.

* * * * *